United States Patent Office 2,776,950
Patented Jan. 8, 1957

2,776,950

SYNTHETIC POLYAMIDE RESINS FROM 5-t-BUTYL-m-XYLYLENE DIAMINE

Funston G. Lum and Earl F. Carlston, Richmond, Calif., assignors to California Research Corporation, San Francisco, Calif., a corporation of Delaware No Drawing. Application July 17, 1953,
Serial No. 368,817

4 Claims. (Cl. 260—78)

This invention relates to new and useful synthetic polyamide resins. More particularly, the invention concerns novel polyamide resins possessing superior molding properties as well as other desirable characteristics.

Synthetic polyamide resins are generally known to the art. The most widely known resins of this type are the nylons which are conventionally obtained by the condensation of aliphatic diamines with aliphatic dicarboxylic acids. Although the nylons are generally satisfactory in their resistance to heat and chemicals, they are inherently opaque or translucent and, therefore, unsuitable for many molding purposes, and the like, where clear transparent materials are desirable. Furthermore, the nylons are subject to other disadvantages in that they are difficult to dye and have low moisture absorbing ability when employed in fibrous materials.

We have now discovered a novel class of synthetic polyamide resins of 5-t-butyl-m-xylylene diamine and an aliphatic dicarboxylic acid of 6 to 10 carbon atoms which are unexpectedly clear and transparent and which are further characterized by an unusual molecular structure which is highly desirable in the production of fibrous materials of improved dyeability and moisture retentivity. These synthetic polyamide resins possess recurring units of the structural formula:

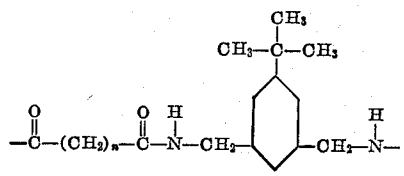

in which $n$ is 4 to 8.

The novel synthetic polyamide resins of the invention are completely clear and transparent in their natural state and are highly suitable for the production of molded articles, and the like, where clear thermoplastic materials are desired. Ordinary meta-xylylene diamine, on the other hand, has been found to yield opaque or translucent polyamide resins when reacted with the commonly available aliphatic dicarboxylic acids such as adipic acid and sebacic acid. The superpolyamides of the invention are also unique in that they possess bulky symmetrically positioned tertiary-butyl groups within the molecular structure. This is greatly desired for the improved dyeability, moisture retentivity and flexural and impact strengths it imparts to synthetic plastic compositions.

The novel superpolymers of 5-t-butyl-m-xylylene diamine and an aliphatic dicarboxylic acid of 6 to 10 carbon atoms in accordance with this invention are prepared essentially by condensing 5-t-butyl-m-xylylene diamine with the acid to produce a high polymer. The condensation may be effected by heating the diamine and the acid in a reaction vessel from which the water formed in the condensation reaction is removed by distillation. For present purposes a three-stage procedure is preferred involving (1) formation of an aqueous nylon salt, (2) separation of the salt or heating of the water and salt to evaporate the water and form a low polymer, and (3) polymerization of the separated salt or further polymerization of the low polymer produced in the previous step to a high polymer.

The aqueous nylon salts of 5-t-butyl-m-xylylene diamine and aliphatic dicarboxylic acids of 6 to 10 carbon atoms may be prepared by neutralizing the diamine in water with the dibasic acid. Approximately equimolecular proportions of acid and diamine are generally employed.

The nylon salts formed in the above reaction may be precipitated by several means. A lower molecular weight alcohol such as isopropanol may be added to precipitate the salt or the solution may be cooled. The precipitated nylon salts may be separated by any suitable means for separating solids and liquids such as filtration, centrifuging, etc.

In accordance with the preferred method, the necessity for separating the nylon salt may be avoided by heating the aqueous nylon salt solution to evaporate the water and form a low polymer. Following the formation of the low polymer, the heating may be continued at reduced pressures as described in the following paragraph to give the polyamide resin of the invention.

In the method employing separation of the nylon salt, the polymerization is effected by heating the salt to the temperature at which condensation occurs to form a highly polymeric product. An inert atmosphere such as nitrogen gas is desirable in this operation. After the initial formation of a low polymer, the polymerization is most conveniently continued by heating at reduced pressures of 40 millimeters of mercury or less. Temperatures in the range of 240 to 280° C. and pressures of 0.01 to 0.1 millimeters of mercury are preferred.

The 5-t-butyl-m-xylylene diamine is conveniently and economically prepared from 5-t-butyl-isophthalonitrile by hydrogenation as described in copending U. S. patent application Serial No. 368,819 of Louis L. Ferstandig, which was filed July 17, 1953.

The aliphatic dicarboxylic acids of from 6 to 10 carbon atoms employed in the preparation of the synthetic polyamide resins of 5-t-butyl-m-xylylene diamine according to the present invention are preferably alpha- and omega-aliphatic dicarboxylic acids. These acids have two carboxyl groups, one on each end of the carbon chain. Such acids may also be described as polymethylene dicarboxylic acids of 6 to 10 carbon atoms. These may be represented by the following structural formula:

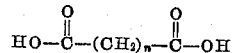

in which $n$ is 4 to 8. Dicarboxylic acids within the above-described group are adipic acid, pimelic acid, suberic acid, azelaic acid and sebacic acid. The invention finds its greatest utility in the use of the more commonly available dicarboxylic acids such as adipic acid and sebacic acid which possess an even number of carbon atoms. Even when such acids are employed, the synthetic polyamide resins of the invention are found to be remarkably clear and transparent and highly suitable for molding operations, and the like, where such properties are desired. On the other hand, polyamide resins of ordinary m-xylylene diamine and such acids have been found to be opaque for no apparent reason and are, therefore, unsuitable for operations such as molding, and the like, in which clear and transparent materials are required.

The following examples are offered in further illustration of the invention. The proportions given are on a weight basis unless otherwise specified.

Example 1

1.5 parts of an approximately 50% aqueous solution of 5-t-butyl-m-xylylene diamine and 0.57 parts by weight of adipic acid were mixed in a reaction flask. The contents of the flask were heated slowly from 260 to 270° C. over a period of 1 to 2 hours. Water was thus distilled off and a low polymer was formed. The heating was then continued at a reduced pressure of about 0.01 to 0.1 mm. mercury for an additional one-half hour to give a highly polymeric 5-t-butyl-m-xylylene adipamide having a molecular weight of about 10,000 to 12,000.

The highly polymeric 5-t-butyl-m-xylylene adipamide prepared above on slow cooling was clear and transparent. It had a melting point of about 165–170° C.

*Example 2*

1.5 parts of an approximately 50% aqueous solution of 5-t-butyl-m-xylylene diamine and 0.79 parts by weight of sebacic acid were mixed in a reaction flask. The contents of the flask were heated slowly from 260 to 270° C. over a period of 1 to 2 hours. Water was thus distilled off and a low polymer was formed. The heating was then continued at a reduced pressure of about 0.01 to 0.1 mm. mercury for an additional one-half hour to give a highly polymeric 5-t-butyl-m-xylylene adipamide having a molecular weight of about 10,000 to 12,000.

The highly polymeric 5-t-butyl-m-xylylene adipamide prepared above on slow cooling was clear and transparent. It had a melting point of about 145–150° C.

For the purpose of comparison, similar preparations were also carried out in which ordinary meta-xylylene diamine was reacted with adipic acid and sebacic acid. In both of these experiments the polyamide resin obtained was opaque and, therefore, unsuitable for molding operations, and the like, where clear and transparent materials are needed.

We claim:

1. A polyamide resin of 5-t-butyl-m-xylylene diamine and an aliphatic dicarboxylic acid of 6 to 10 carbon atoms.

2. A polyamide resin possessing recurring units of the structural formula:

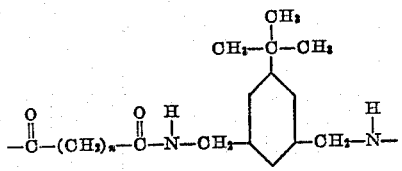

in which $n$ is 4 to 8.

3. A 5-t-butyl-m-xylylene adipamide resin.
4. A 5-t-butyl-m-xylylene sebacamide resin.

References Cited in the file of this patent
UNITED STATES PATENTS

| | | |
|---|---|---|
| 2,071,251 | Carothers | Feb. 16, 1937 |
| 2,268,586 | Gilman | Jan. 6, 1942 |
| 2,640,080 | De Tar et al. | May 26, 1953 |